United States Patent
Rathinam

(10) Patent No.: US 7,437,225 B1
(45) Date of Patent: Oct. 14, 2008

(54) FLIGHT MANAGEMENT SYSTEM

(75) Inventor: Sethu R. Rathinam, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 249 days.

(21) Appl. No.: 11/193,008

(22) Filed: Jul. 29, 2005

(51) Int. Cl.
*G06F 19/00* (2006.01)

(52) U.S. Cl. .............. 701/14; 701/16; 701/29; 701/35; 701/301; 701/120; 340/961; 342/36; 342/353

(58) Field of Classification Search ........... 701/120, 701/16, 14, 29, 35, 301; 340/961; 342/35, 342/353
See application file for complete search history.

(56) References Cited

U.S. PATENT DOCUMENTS

| | | | | |
|---|---|---|---|---|
| 5,025,382 A | * | 6/1991 | Artz ..................... | 701/120 |
| 5,450,329 A | * | 9/1995 | Tanner .................. | 701/213 |
| 5,574,648 A | * | 11/1996 | Pilley ................... | 701/120 |
| 5,867,804 A | * | 2/1999 | Pilley et al. ............ | 701/120 |
| 5,890,079 A | * | 3/1999 | Levine .................. | 701/14 |
| 5,904,724 A | * | 5/1999 | Margolin ............... | 701/120 |
| 6,549,162 B1 | * | 4/2003 | Gage et al. ............. | 342/353 |
| 6,721,714 B1 | * | 4/2004 | Baiada et al. ........... | 705/7 |
| 6,732,027 B2 | * | 5/2004 | Betters et al. ........... | 701/29 |
| 6,739,556 B1 | * | 5/2004 | Langston ............... | 244/189 |
| 6,789,011 B2 | * | 9/2004 | Baiada et al. ........... | 701/120 |
| 6,917,863 B2 | * | 7/2005 | Matos ................... | 701/16 |
| 7,035,721 B2 | * | 4/2006 | Koncelik, Jr. ........... | 701/9 |
| 7,113,852 B2 | * | 9/2006 | Kapadia et al. .......... | 701/33 |
| RE39,618 E | * | 5/2007 | Levine .................. | 701/29 |
| 2003/0065428 A1 | * | 4/2003 | Mendelson et al. ....... | 701/9 |
| 2003/0130770 A1 | * | 7/2003 | Matos ................... | 701/3 |
| 2003/0139875 A1 | * | 7/2003 | Baiada et al. ........... | 701/120 |
| 2003/0141418 A1 | * | 7/2003 | Darbyshire ............. | 244/195 |
| 2003/0195693 A1 | * | 10/2003 | Flynn et al. ............. | 701/120 |
| 2005/0151025 A1 | * | 7/2005 | Mendelson et al. ....... | 244/195 |
| 2006/0032978 A1 | * | 2/2006 | Matos et al. ............ | 244/118.5 |
| 2006/0048845 A1 | * | 3/2006 | Slavin et al. ............ | 141/94 |
| 2006/0167599 A1 | * | 7/2006 | Bodin et al. ............ | 701/16 |

* cited by examiner

*Primary Examiner*—Thomas Black
*Assistant Examiner*—Wae Louie
(74) *Attorney, Agent, or Firm*—Nathan O. Jensen

(57) ABSTRACT

The present invention is a system and method for providing flight management to one or more aircraft via a communication link between a fight management system located outside the aircraft and a flight management system located inside the aircraft. Remote flight management system may monitor and control navigation functions, substantially reducing pilot or crewmember workload. Optimized simultaneous flight management of multiple aircraft located within a specified area or within a specified fleet may be provided. Remote flight management system may be suitable for monitoring and controlling navigation functions for multiple aircraft from a single location.

20 Claims, 12 Drawing Sheets

FLIGHT MANAGEMENT SYSTEM

FIELD OF THE INVENTION

The present invention relates generally to aviation navigation systems, and more particularly to a remote flight management system.

BACKGROUND OF THE INVENTION

Flight management systems (FMSs) provide enhanced situational awareness and reduce the navigation related workload required of pilots and flight crews. Specifically, FMSs provide flight planning and navigation capabilities such as path guidance, weather and traffic alerts, and flight performance information. Typically, a FMS acquires formatting navigation data and forwards the data to a display system located in the cockpit during flight. FMS navigation data may include waypoints, headings between waypoints, distances, and airports. Navigation data is displayed in real-time during flight to chart a course from an origination point to a destination point. Additionally, FMSs may be utilized for time or fuel planning, predictions based on an aircraft's flight manual data, airdrop, and search and rescue patterns.

Current flight management systems utilized for optimizing path guidance as well as fuel and other performance costs for individual aircraft are typically installed in each aircraft, and therefore provide optimization only for the aircraft in which the system is installed. Consequently, an aircraft's performance may only be optimized if a flight management system has been installed. Additionally, optimization may not be achieved for multiple aircraft simultaneously, as desired by a fleet operator. This may result in decreased efficiency when determining landing priorities, which may lead to flight delays, missed connections and increased fuel costs. Additionally, these individual systems may be expensive for aircraft operators.

Another disadvantage of current flight management systems is the amount of heads-down time for a pilot or crewmember who must constantly monitor the information received from the flight management system. Heads-down time occurs when the pilot or crewmember is neither looking at the primary flight displays, nor out the wind screen, but instead is focused upon a task in an oblique direction, such as when operating a typical FMS control display unit (CDU). Due to the complex nature of current flight management systems, heads-down time may be significant. The problem of heads-down time may be further compounded by inherent time limitations for decision-making. For example, when making a final approach, a pilot may only have a few miles of obstacle clearance area. As a result, a pilot must react immediately and correctly on the first attempt. To minimize pilot distraction and reduce pilot heads-down time, aircraft operators may employ extra crewmembers, resulting in increased costs and reduced passenger or cargo carrying capabilities.

Consequently, it would be advantageous if a system and method existed that provided flight management to one or more aircraft via a secure, reliable communication link between a flight management system located outside the aircraft and a flight management system located onboard the aircraft. It would be similarly advantageous to provide optimized flight management of multiple aircraft located within a specified area or within a specified fleet via a single remote flight management system.

SUMMARY OF THE INVENTION

Accordingly, the present invention is directed to a novel system and method for providing flight management for one or more aircraft via a communication link between a fight management system located outside the aircraft and a flight management system located inside the aircraft. A remote flight management system operator may monitor and control navigation functions from a control station, substantially reducing pilot or crewmember workload. The present invention may be further directed to providing optimized flight management of multiple aircraft located within a specified area or within a specified fleet via a single remote flight management system. Remote flight management system may be suitable for monitoring multiple aircraft and controlling navigation functions individually or simultaneously from a single location. Additionally, remote flight management system may be operable with present FMSs including legacy FMSs and Business and Regional System (BRS) FMSs.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to a presently preferred embodiment of the invention, an example of which is illustrated in the accompanying drawings.

Figure 1:
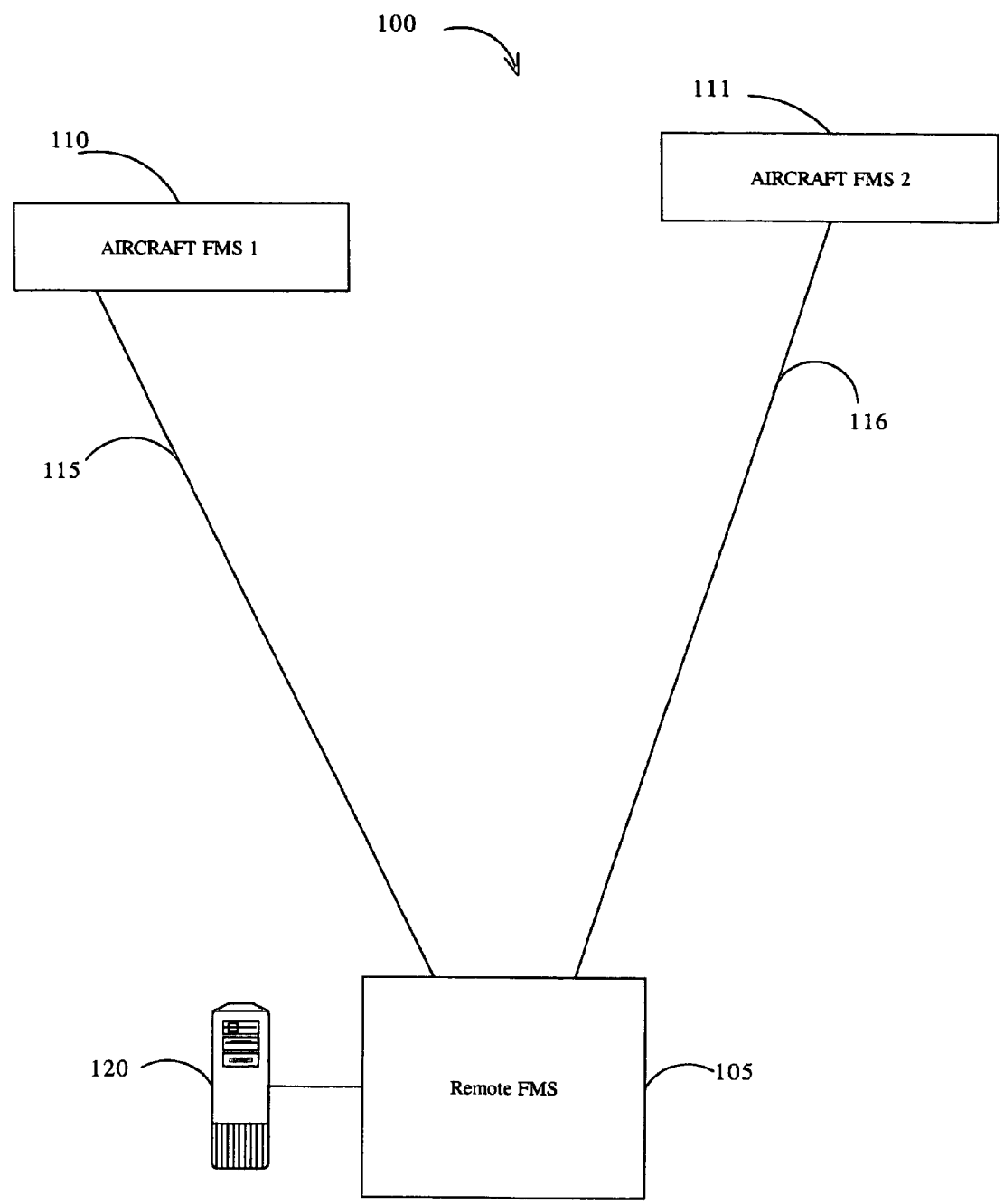
FIG. 1 depicts a block diagram of a flight management system in accordance with the present invention.

Referring to FIG. 1, a flight management system (FMS) 100 in accordance with the present invention is shown. FMS may include a remote FMS 105 located outside an aircraft, an aircraft FMS unit 110-111 located inside one or more aircraft, and communication link 115-116. Remote FMS 105 may be operably connected to aircraft FMS 110 via communication link 115. Remote FMS may be operable connected to aircraft FMS 111 via communication link 116. Remote FMS 105 may include a server 120 for performing flight performance calculations for multiple aircraft. Remote FMS server 120 may be capable of managing flight performance for multiple aircraft from a single location. For example, remote FMS server 120 may store data for multiple aircraft and transfer information and commands to one or more aircraft. Furthermore, remote FMS may be coupled to a worldwide network and suitable for retrieval of flight related data from the worldwide network. In one embodiment of the invention, worldwide network may be the Internet.

Remote FMS 105 may be capable of managing individual or multiple aircraft from a remote location via a communication link, and may provide improved efficiency over conventional flight management systems. For example, a remote FMS 105 monitoring aircraft operations may command designated functions from a remote based operating station, reducing pilot and crewmember workload and distraction, and possibly eliminating the need for additional crewmembers. Further, remote FMS 105 may provide reduced pilot heads-down time, increasing pilot and passenger safety. Remote FMS 105 may monitor fuel levels, weather conditions and other hazards for one or more aircraft. For example, remote FMS 105 may monitor fuel flow, total fuel used, fuel remaining miles per gallon, miles until empty, time until empty, fuel remaining at the next GPS waypoint, and like fuel performance factors for one or more aircraft from a remote location. Remote FMS 105 may analyze and compare fuel performance data for each aircraft to optimize landing and refueling determinations, which may reduce fuel cost to aircraft operators.

Remote FMS 105 may also monitor wind and weather conditions for one or more aircraft. Typically, a pilot or crewmember must enter a current heading to allow computation by a conventional FMS of the current headwind, tailwind, and crosswind components, current wind direction, wind speed, and other like wind factors. Heading information may be received by remote FMS 105, which may determine an aircraft's position, perform wind calculations and transfer the resultant data to the aircraft. Remote FMS 105 may also monitor weather conditions at current and future aircraft positions, such as temperature, precipitation, pressure and other like weather conditions. Changing weather conditions discovered by the remote FMS may result in a heading change, altitude change and the like for an aircraft. Data may be transmitted to aircraft FMS 110, further reducing pilot distraction.

It is contemplated that operators of small, regional or large aircraft fleets or terminals may manage multiple aircraft with a single remote flight management system, providing optimization of performance and efficiency, while reducing costs by eliminating the need for costly individual flight management systems. Additionally, remote FMS 105 may be operable with existing aircraft FMSs. This may provide a redundant system and a means to verify monitored conditions. Remote FMS 105 may analyze data received from individual aircraft and compare data to achieve optimized flight scheduling. Remote FMS may also analyze data received from a worldwide network, such as the Internet to assess gate availability, predict expected time of arrival or landing, and provide connecting flight information for an aircraft managed by remote FMS unit 105. For example, remote FMS may be alerted to delays or early arrivals and may determine optimal landing order for aircraft managed by remote FMS 105. Remote FMS 105 may further provide surface management of aircraft, including enhanced situational awareness regarding the current and future state of surface traffic and constraints. For example, a flight may arrive early due to winds at altitude. If the aircraft is scheduled to land at an occupied gate, remote FMS 105 may assess alternative gate availability, allowing the aircraft to land and immediately connect to an available gate, rather than circle or land and taxi until a gate becomes available. Remote FMS 105 may calculate alternatives in response to constraints and prioritize departures and arrivals. This may be especially useful at airline hubs, where departing and arriving aircraft may be part of a single fleet and may be managed by a single remote FMS 105.

It is further contemplated that remote FMS 105 may provide collaborative optimization between aircraft operators and air traffic service providers, who may employ a similar system to control air traffic, reduce congestion and provide greater situational awareness. An optimization procedure in accordance with the present invention may be based upon several factors and an adjustable priority system may be employed for each factor to implement an optimization procedure. Factors may include fuel amount, estimated time of arrival, a fuel consumption rate, weather factors and the like. It is further contemplated that remote FMSs may provide a fully optimized global airspace system and may be extended to optimize all aspects of transportation. For example, remote FMS 105 may be utilized to coordinate ground transportation before and after flights such as dispatching taxis or like ground transportation to pick up or drop off passengers at an airport. It is further contemplated that simultaneous fleet management and optimization may be capable of organizing multiple flights and may enable passengers to select flights based on characteristics such as landing priority. This may be advantageous, as remote FMS 105 may provide the most accurate data regarding flight arrival and departure time based on monitoring of and communication with each aircraft in a fleet, geographic area or the like.

Figure 2:
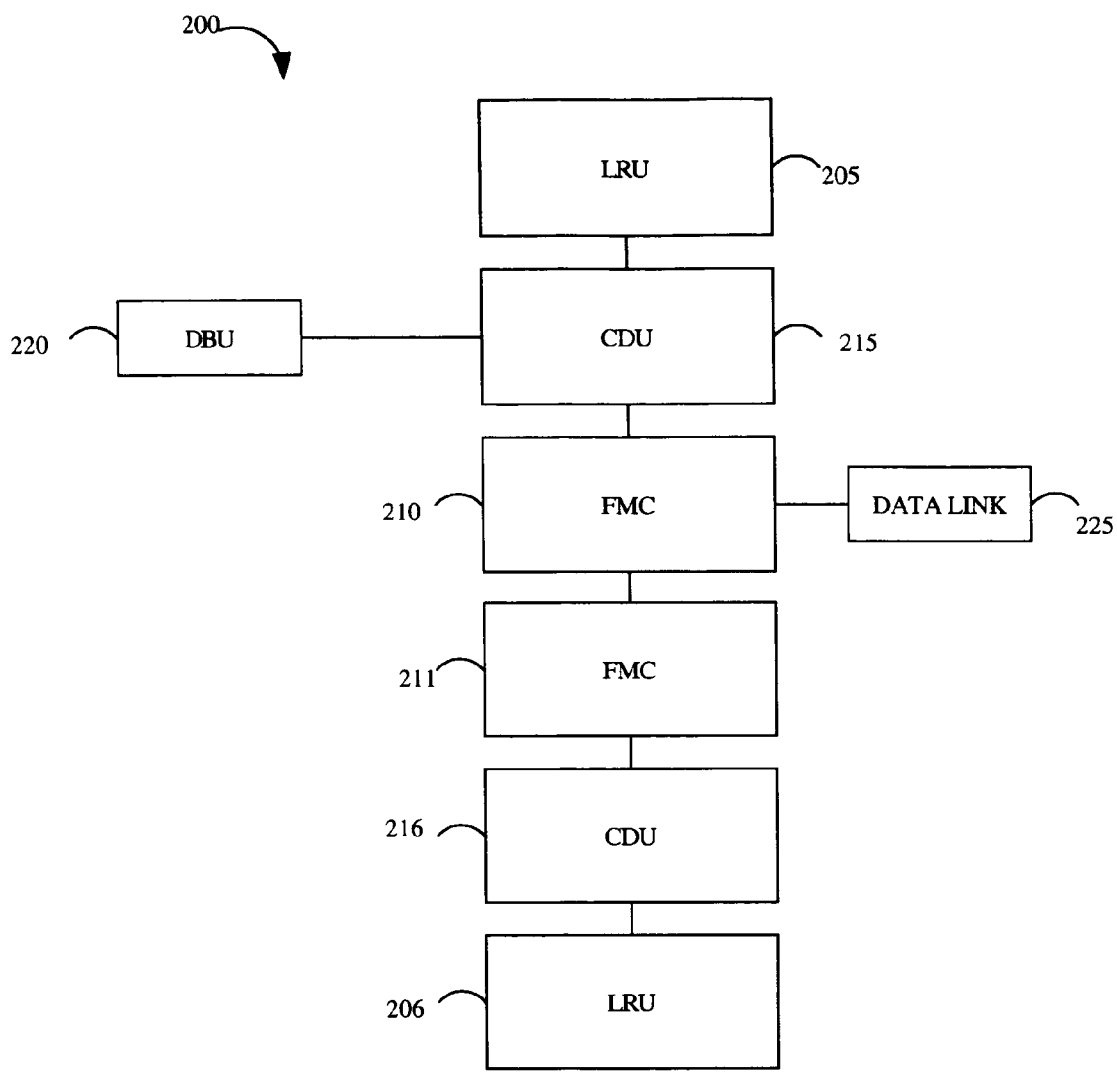
FIG. 2 depicts a block diagram of a remote flight management system for a flight management system in accordance with the present invention as illustrated in FIG. 1.

Referring to FIG. 2, a remote FMS 200 in accordance with the present invention is shown. Remote FMS 200 may be suitable for remotely managing navigation and providing optimization for individual or multiple aircraft. Remote FMS 200 may receive information, manage data, and distribute commands for multiple aircraft individually or simultaneously. For example, remote FMS 200 may provide integrated multi-sensor navigation, flight maintenance and execution, sensor control, multifunction display (MFD) map support, and steering/pitch commands to the flight control systems of one or more aircraft. Remote FMS 200 may manage performance and navigation functions for multiple aircraft individually, simultaneously, consecutively or at any other such time interval. Remote FMS 200 may be comprised of one or more line replaceable units (LRUs) 205-206, one or more flight management computers (FMCs) 210-211, one or more control display units 215-216 (CDUs) and a data base unit (DBU) 220. Remote FMS 200 may be further comprised of an aircraft data link unit 225, such as a spread spectrum transmitter for transmitting information and commands to aircraft. Similar to conventional onboard FMSs, remote FMS 200 may use available combinations of Global navigation satellite system (GNSS), Distance Measuring Equipment (DME), VHF Omnidirectional Radio Range (VOR)/DME, Inertial Reference System (IRS), and dead reckoning data received via a secure data link to provide en route, terminal and non-precision approach navigation guidance for each aircraft in a fleet or within a geographically defined area. Global positioning system (GPS) may be one example of GNSS. Additionally, remote FMS 200 may be designed in accordance with current ARINC and GATM requirements.

Figure 3:
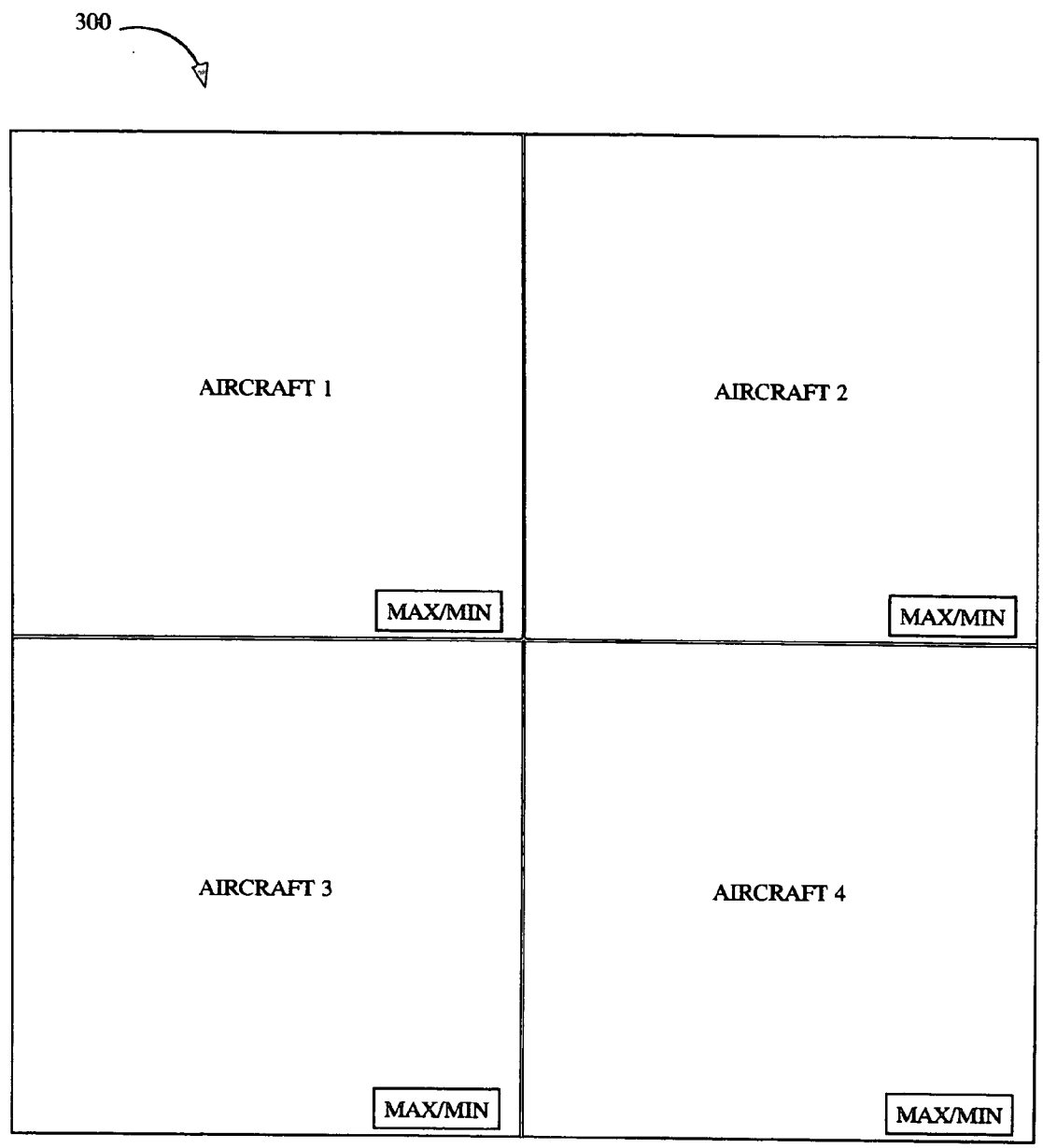
FIG. 3 depicts a planar front side view of a remote flight management control display unit for the flight management system as illustrated in FIG. 2.

Referring to FIG. 3, a remote FMS CDU (CDU) 300 in accordance with the present invention is shown. CDU 300 may be an interactive multi-mode display such as a multifunction display (MFD) suitable for simultaneously displaying FMS map and textual data for each aircraft. For example, CDU 300 may be an integrated keyboard and textual display unit, and may employ a scratchpad entry structure that allows for rapid entry and retrieval of data for system or operator use. Remote FMS CDU 300 display screen may be segmented for displaying aircraft data for multiple aircraft simultaneously. In a preferred embodiment, individual aircraft data may be expanded or contracted by remote FMS operator via a minimize/maximize function, allowing for enhanced display of individual aircraft data and more precise analysis and decision-making. In an alternative embodiment, remote FMS CDU 300 may display aircraft data individually, and may include a toggle function for accessing data from simultaneously operating aircraft managed with remote FMS by toggling between screens.

Figure 4:
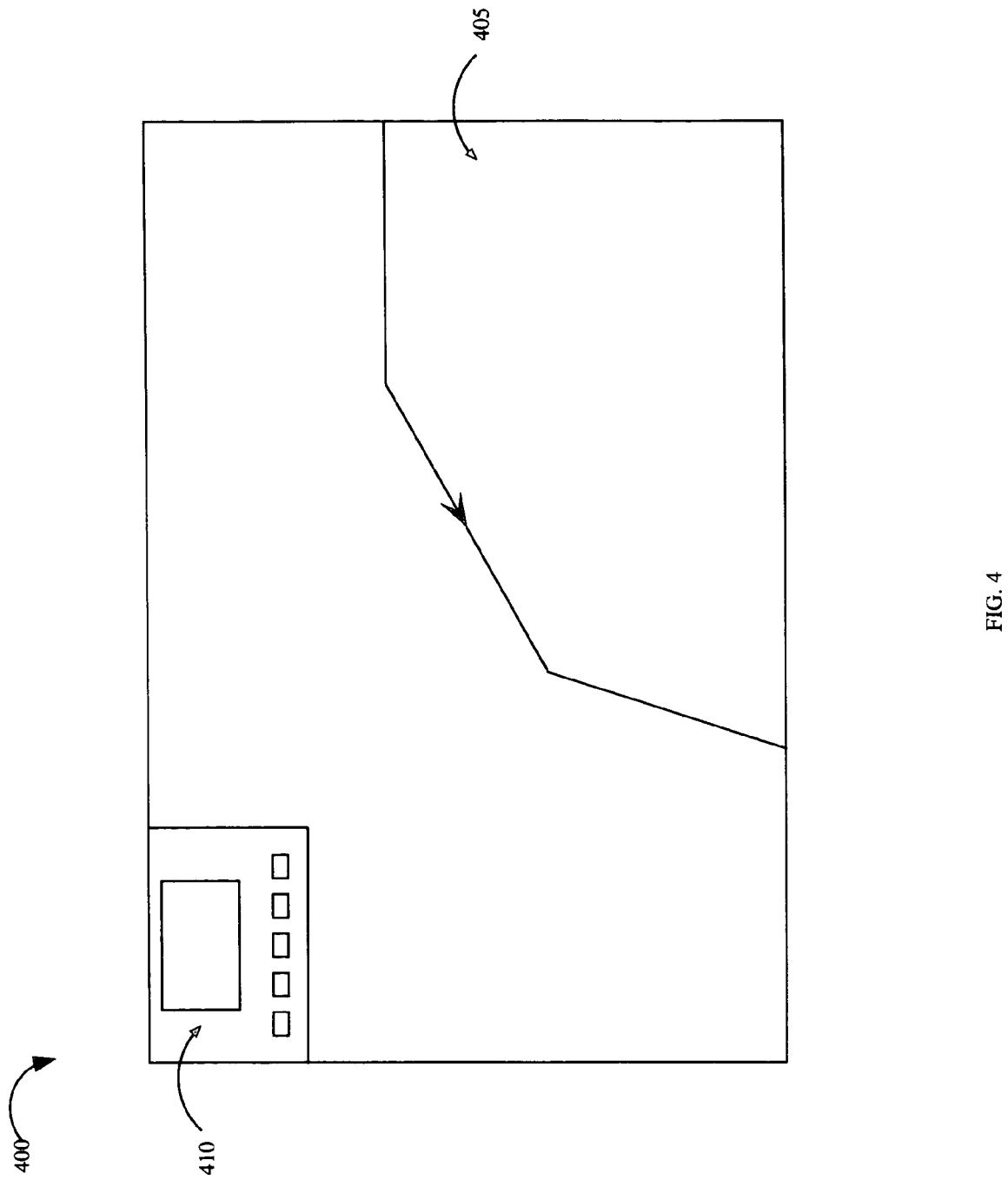
FIG. 4 depicts a graphical representation of a multifunction display screen provided on a control display unit as illustrated in FIG. 3.

Referring to FIG. 4, a multifunction display (MFD) screen 400 provided on a control display unit for use in the system illustrated in FIG. 3 is shown. An activated flight plan may be graphically presented to remote user on the MFD 400, enabling constant monitoring of aircraft position. In a preferred embodiment, MFD 400 may be further comprised of an adaptive map segment 405 and a configurable text window 410 exhibiting a graphical user interface. Graphical map information may be displayed in all or a substantial portion of display area not utilized by configurable text window 410. A progress display may be integrated with a text window 410 for displaying relevant progress and vertical navigation information. Text window 410 may display traffic alerts, collision avoidance warnings, weather overlays, and other like information. Maps may be two or three dimensional, and may be oriented as desired by the user. For example, maps may be oriented heading-up, with present position near the bottom center of the map, or north-up, with the map centered on a specific waypoint. Reference data such as navaids, intersections, airports, terminal waypoints and non-directional beacons may also be displayed, allowing easy determination of flight progress. Waypoints may also be configured to display altitude restrictions and predicted estimated time of arrival. In addition, flight plan map may be two or three-dimensional and provide plan and profile views for en route, terminal and approach phases of flight for each aircraft managed by remote FMS.

Figure 5:
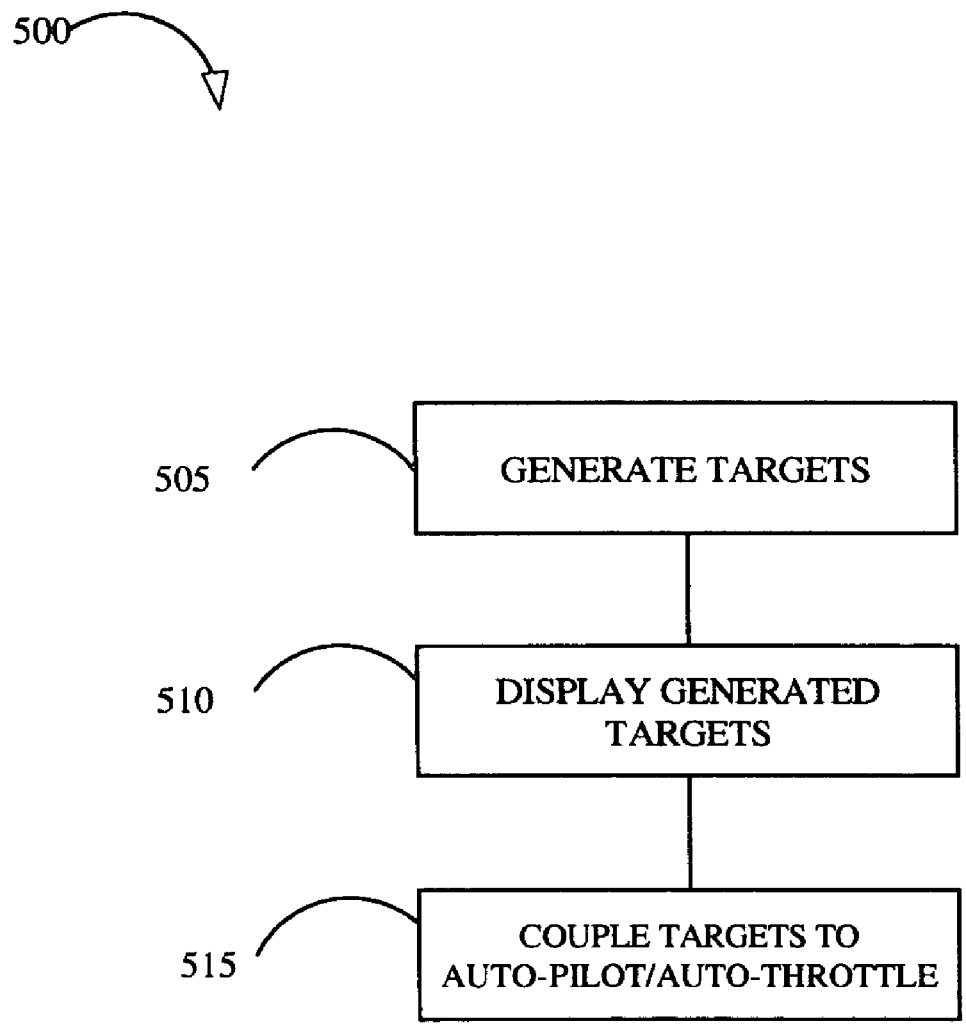
FIG. 5 depicts a flow chart representing a process of remotely providing multiple waypoint vertical navigation for an aircraft in accordance with the present invention.

Referring to FIG. 5, a flowchart 500 representing a process of remotely providing multiple waypoint vertical navigation (VNAV) for an aircraft in accordance with the present invention is shown. VNAV guidance function typically provides control of an aircraft along the vertical route of a flight plan. For example, VNAV guidance may generate pitch, speed, altitude, and thrust targets 505. Generated targets may be displayed 510 to remote FMS operator on a CDU. Remote FMS may then elect to couple targets to an aircraft's autopilot or auto-throttle equipment 515, if the aircraft is so equipped. Remote FMS may utilize VNAV, full flight phase capabilities, and may also database Departure Procedures (DPs), standard terminal arrival routes (STARs) and approaches. Remote FMS may further utilize multiple waypoint VNAV for various flight phases such as climb, cruise and descent.

Remote FMS may also utilize VNAV to ensure that a specified vertical flight profile is followed, that altitude and speed constraints at waypoints are met, and that all aircraft are complying with designated speed limits. For example, remote FMS may automatically command the autopilot to sequence modes and set target speeds and target altitudes, ensuring that flight plan requirements are met. Alternatively, remote FMS may communicate information to pilot via onboard FMS, radio communication, or a like communication system. Additionally, if remote FMS commands the airplane to violate a VNAV constraint, a pilot may be alerted by a VNAV function on aircraft FMS, and may override remote FMS commands.

Figure 6:
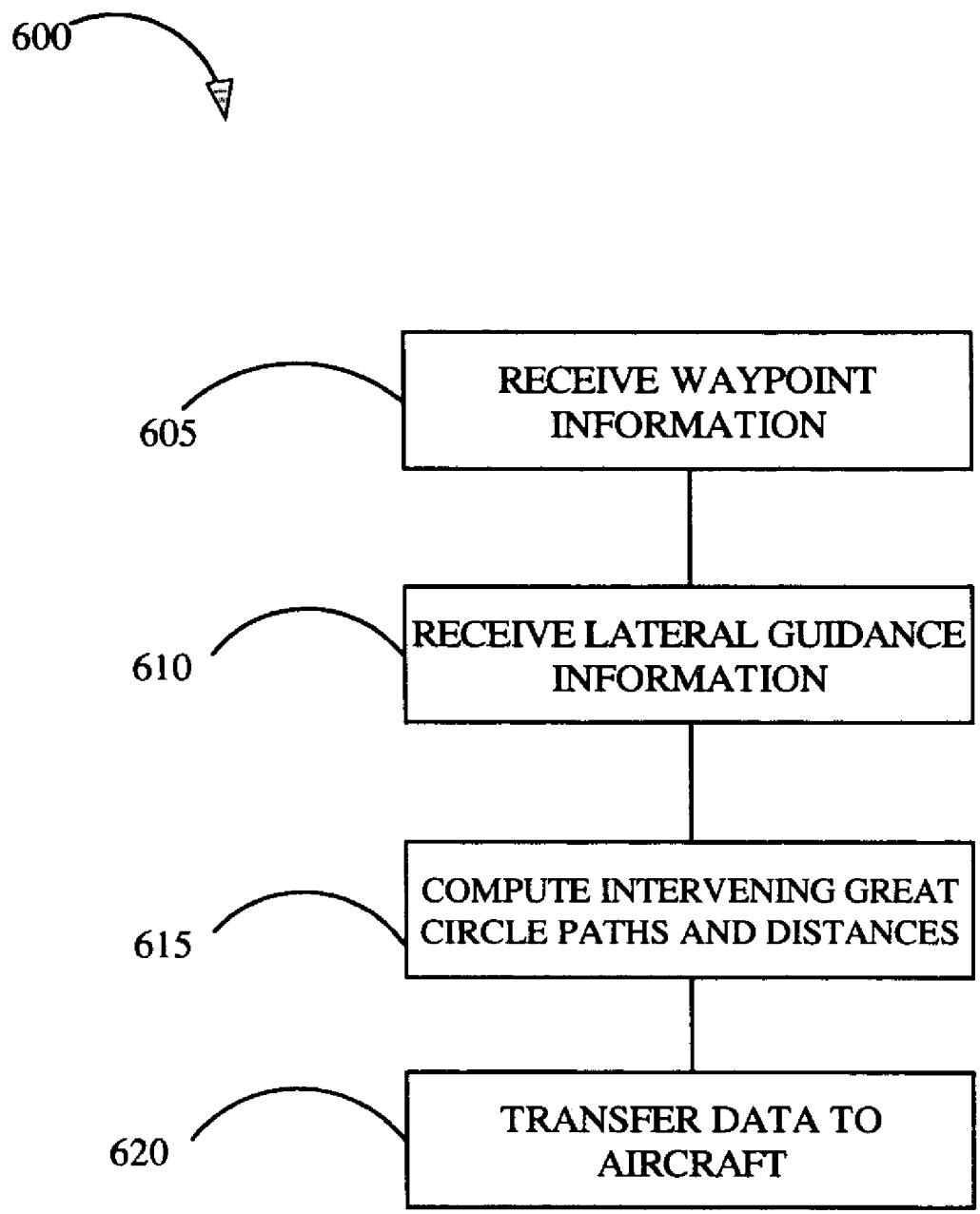
FIG. 6 depicts a flow chart representing a process of remotely providing lateral guidance for an aircraft in accordance with the present invention.

Referring to FIG. 6, a flow chart 600 representing a process of remotely providing lateral guidance for an aircraft in accordance with the present invention is shown. A lateral guidance function may provide guidance between waypoints of an active flight plan route. Remote FMS may receive waypoint information 605 entered into a flight plan or create additional flight plan legs for one or multiple aircraft. Remote FMS may receive lateral guidance information 610 via the FMS CDU, and may elect to couple the FMS to the autopilot. Remote FMS may automatically compute and display intervening great circle paths and distances 615, and transfer calculated data to aircraft 620. Waypoints may be stored in a navigation database or, alternatively, waypoints may be pilot-defined or remote user-defined. Additionally, frequently traveled routes may be stored in pilot or remote user-defined route databases, which may be accessible to the pilot, remote user, or a like authorized party.

Figure 7:
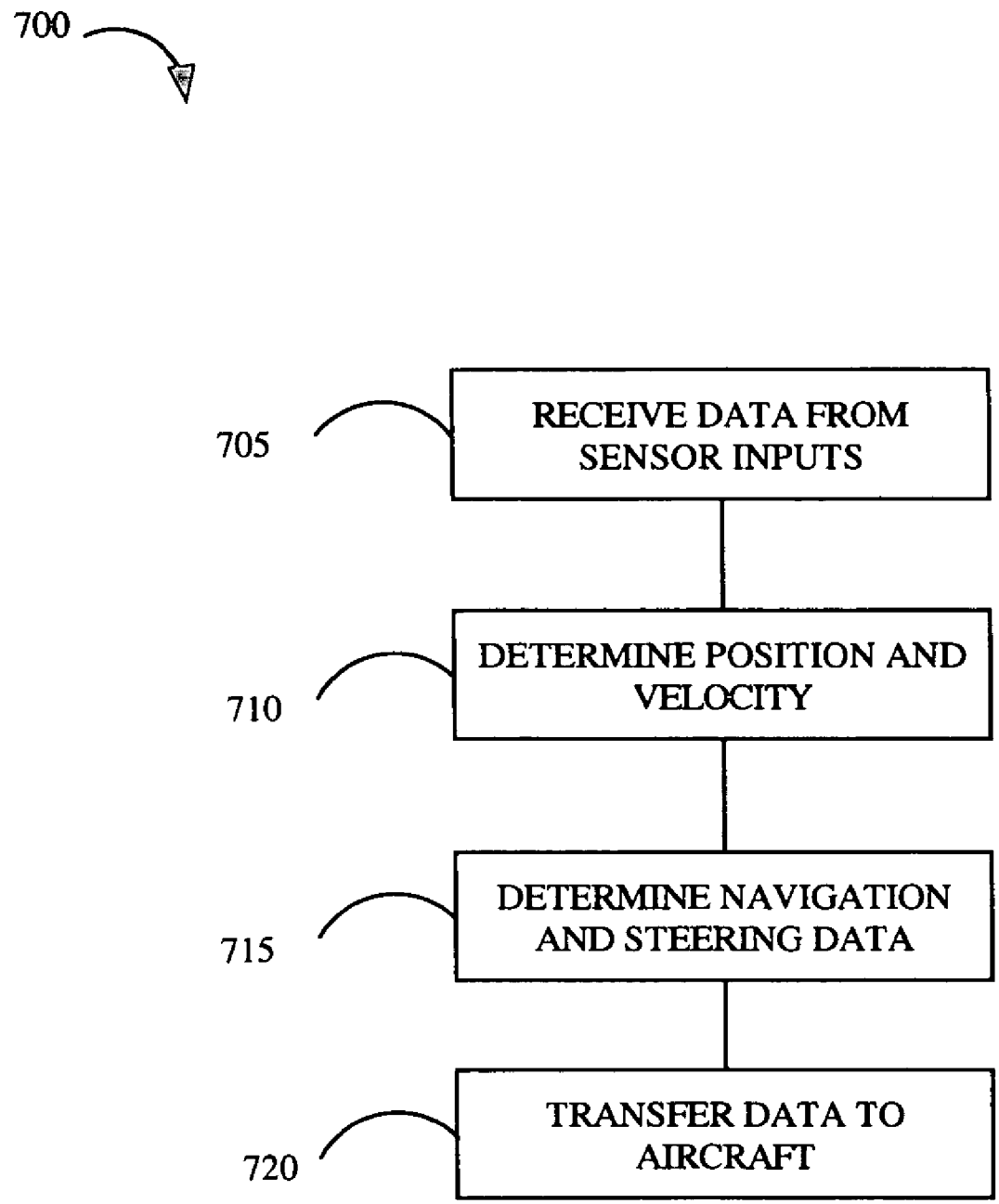
FIG. 7 depicts a flow chart representing a process of remotely providing navigation and guidance for an aircraft in accordance with the present invention.

Referring to FIG. 7, a flow chart 700 representing a process of remotely providing navigation and steering guidance for an aircraft in accordance with the present invention is shown. Remote FMS may provide navigation situation information and steering guidance for one or more aircraft within a fleet or designated geographic area. For example, remote FMS may monitor and control functions such as automatic position initialization. In a preferred embodiment, the system may receive data from sensor inputs 705. Remote FMS may utilize data to determine accurate airplane position and velocity 710. Remote FMS may then utilize calculations to determine navigation situation and steering guidance 715. Remote FMS may transfer navigation situation information and steering guidance to aircraft 720. Sensor usage is typically automatic, requiring no pilot interaction. However, it is contemplated that a pilot or crewmember may utilize aircraft FMS to deselect a sensor or reconfigure sensor usage if desired.

Figure 8:
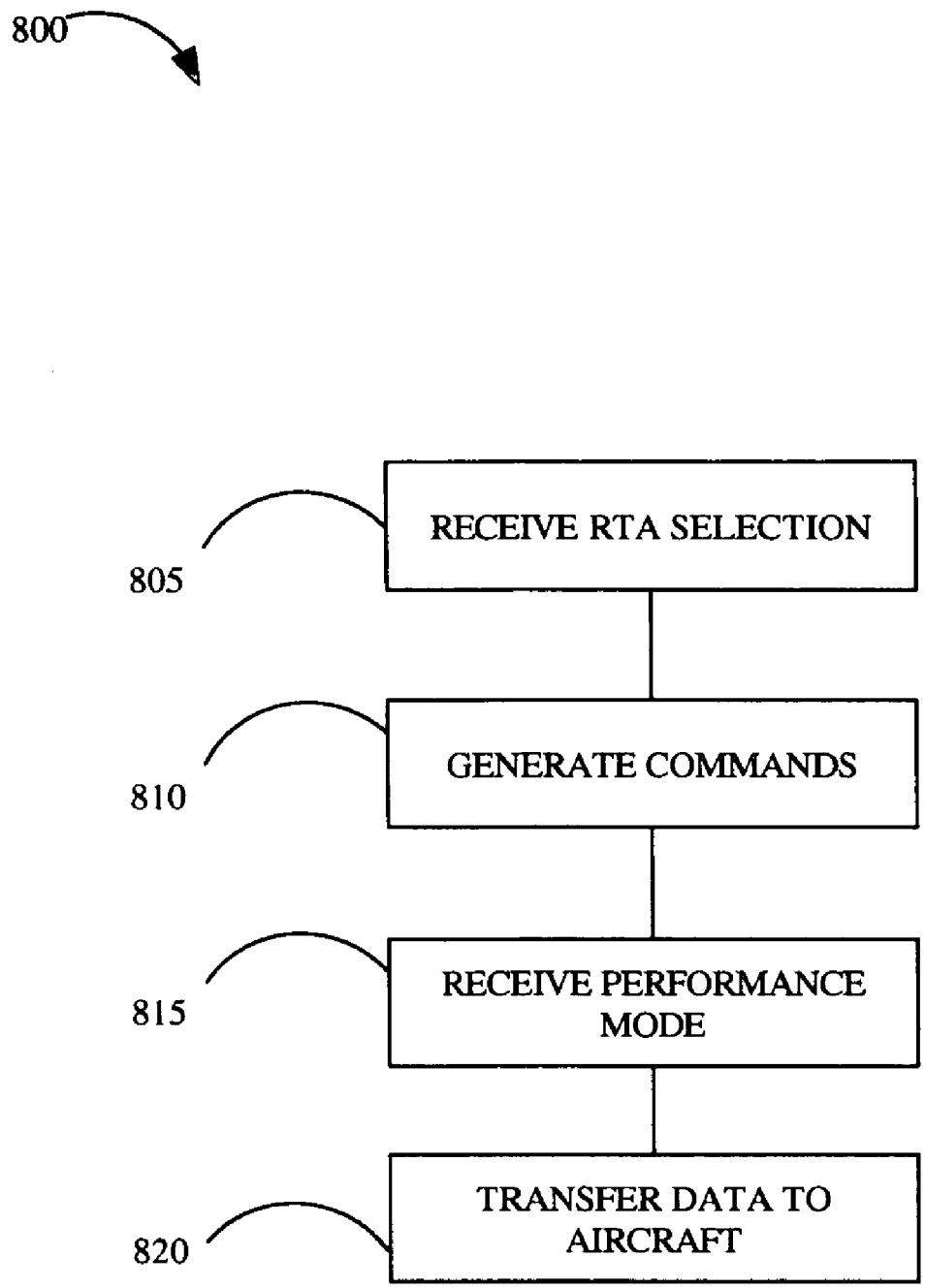
FIG. 8 depicts a flow chart representing a process of remotely providing time navigation for an aircraft in accordance with the present invention.

Referring now to FIG. 8, a flow chart 800 representing a process of remotely providing time navigation is shown. Remote FMS may include a time navigation function. Time navigation function may provide calculated times of arrival at desired waypoints along a flight plan. For example, remote FMS may receive required time of arrival (RTA) selections 805 from remote FMS operator at a waypoint. Remote FMS may generate commands 810 to achieve on time arrival at the desired location. Remote FMS may receive specified performance mode 815, such as RTA, fuel economy, maximum speed or the like, and remote FMS may provide appropriate commands to aircraft 820 to achieve the desired performance. Estimated times of arrival (ETAs) may be displayed 825 to remote user via the remote FMS display and to pilot or crewmembers via an onboard FMS. Performance targets may be translated into flight director cues 830 and may be coupled with autopilot or auto-throttle systems 835 if so desired.

Figure 9:
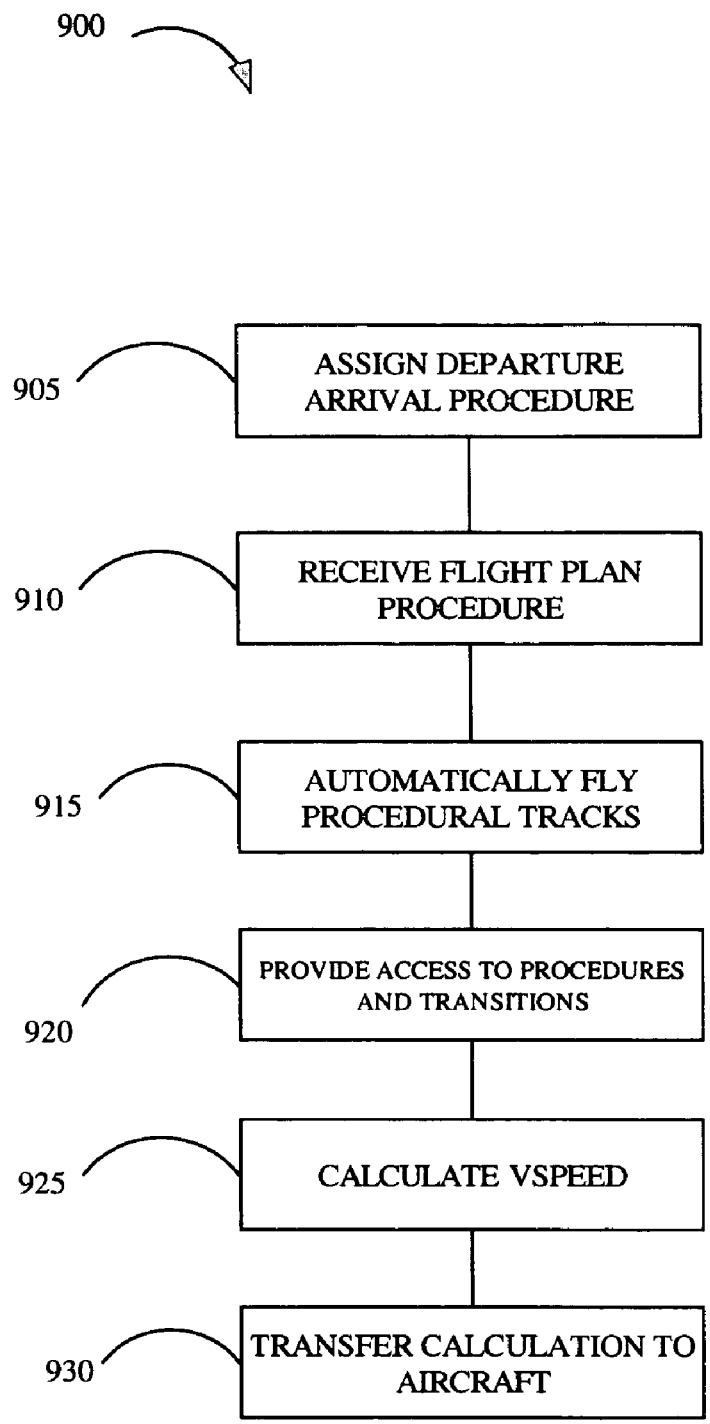
FIG. 9 depicts a flow chart representing a process of remotely providing departure and arrival procedures for an aircraft in accordance with the present invention

Referring to FIG. 9, a flow chart 900 representing a process of remotely providing departure and arrival procedures for an aircraft in accordance with the present invention is shown. A remote based FMS in accordance with the present invention may automatically execute aircraft departure, arrival or both. In one embodiment, DP's, STARs and approaches may be assigned 905 and entered into a flight plan 910, and remote FMS may automatically fly procedural tracks 915. A dedicated function key on the CDU may provide access to terminal and approach procedures and transitions 920. Additionally, remote FMS may calculate the rate of change of pressure altitude (Vspeed) 925 from pre-stored Vspeed tables. Vspeed, which may be calculated within remote FMS FMC for takeoff and approach, may be transferred to the aircraft primary flight display 930.

Figure 10:
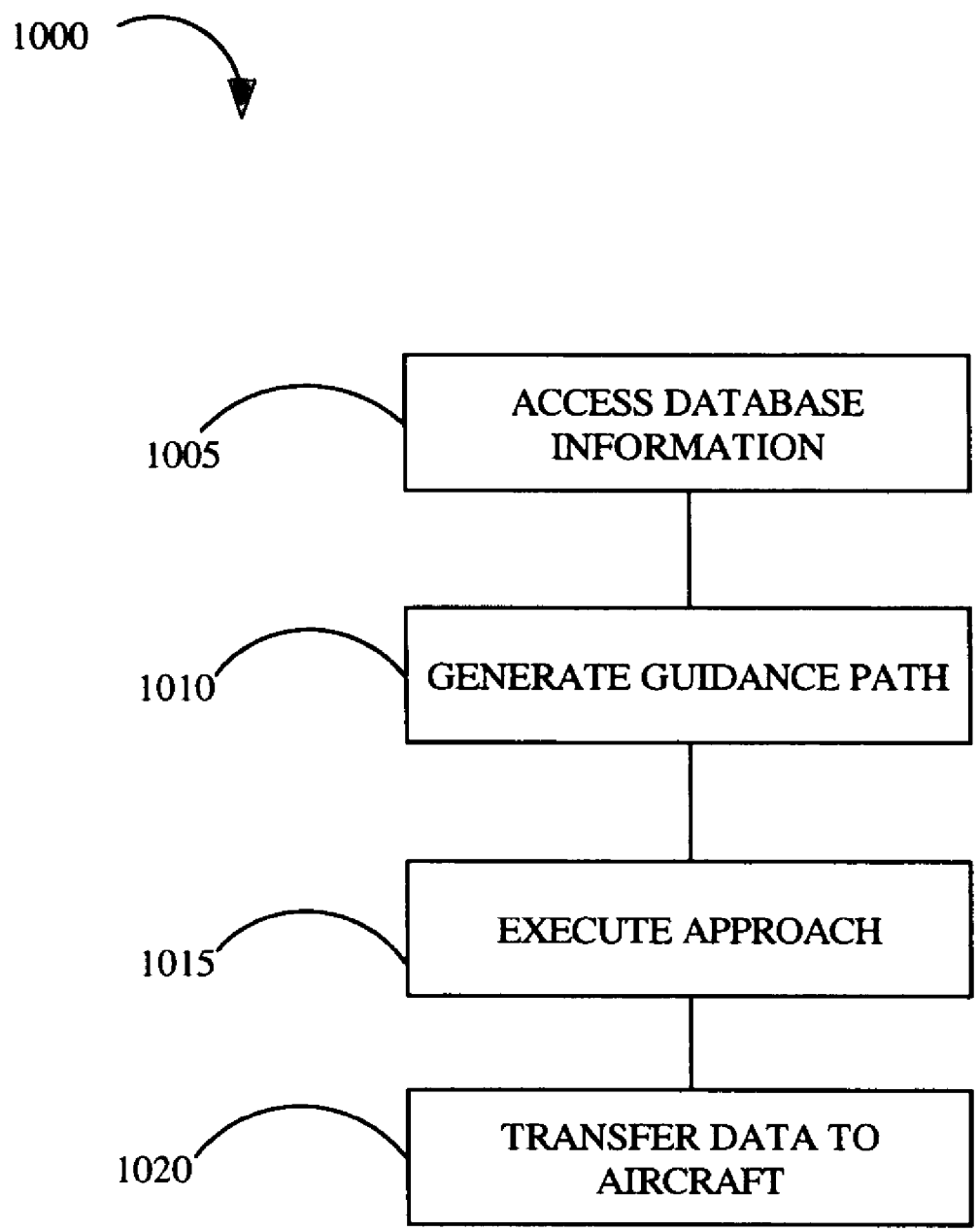
FIG. 10 depicts a flow chart representing a process of remotely executing approaches for an aircraft in accordance with the present invention.

Referring to FIG. 10, a flow chart representing a process of remotely executing approaches for an aircraft in accordance with the present invention is shown. Remote FMS may be designed to automatically execute non-precision GPS approaches, GPS overlay approaches, and multisensor area navigation (RNAV) and VOR approaches. FMS may also provide missed-approach guidance. For example, a pilot may lose visual contact with a runway, caused by unexpected fog or other visual obstruction. Remote FMS may access database information regarding the specific airport and gather flight and navigation information from the aircraft. Remote FMS may then generate a detailed guidance path for a pilot to follow. Guidance path may be calculated utilizing pathway guidance, pitch and roll guidance or a like guidance method. Additional GPS-based approaches may be selected by the system and may include Instrument Landing System (ILS), localizer, localizer back course, Localizer Directional Aid (LDA), Simplified Directional Facility (SDF), Tactical Air Navigation System (TCAN), Non-Directional Radio Beacon (NDB), Long-Range Navigation (LORAN), and the like approaches. Further, a remote FMS database may contain approach definitions and corresponding procedures such as missed-approach procedures. A system may also accommodate the utilization of air traffic control (ATC) radar vectors, which may be issued prior to or during an approach, and may increase flexibility in the heavy workload environment of a terminal area.

The system may predict performance by utilizing aircraft-specific predicted performance computations that allow expanded automatic and accurate time and fuel predictions of the current flight of an aircraft managed by remote FMS. To accomplish this, remote FMS may utilize what-if problem solving to determine what effect changes in altitude, speed, wind or other contingencies may have on the outcome of the flight. Performance predictions such as time and fuel planning predictions may be based on prestored data from an aircraft's flight manual and may be customized for each aircraft, taking into account factors such as flight path, performance, wind, temperature, traffic, hazards, or the like. Performance data may be stored for all flight phases. Additionally, predictions may be calculated from expected flight conditions and parameters, and may be adjusted for actual fuel consumption and flight progress by application of a fuel flow correction factor to prediction data. All or most computations may be done by remote FMS and transferred to aircraft, significantly reducing pilot workload.

Data may be transferred to aircraft FMS via an installed data link and may be operative to communicate with a wireless router segment through wireless communications link. Wireless router segment may route files it receives from an airborne data link segment. Data link segment may collect and store flight performance data generated during flight. It may also store information transferred from remote FMS to the aircraft via a wireless router. A central processing unit of the remote data link may receive flight data and process the data for further downloading or initial determination of a flight plan. In a preferred embodiment, remote FMS data link may be a transceiver capable of downloading and demodulating transmitted data to obtain flight performance data.

Figure 11:
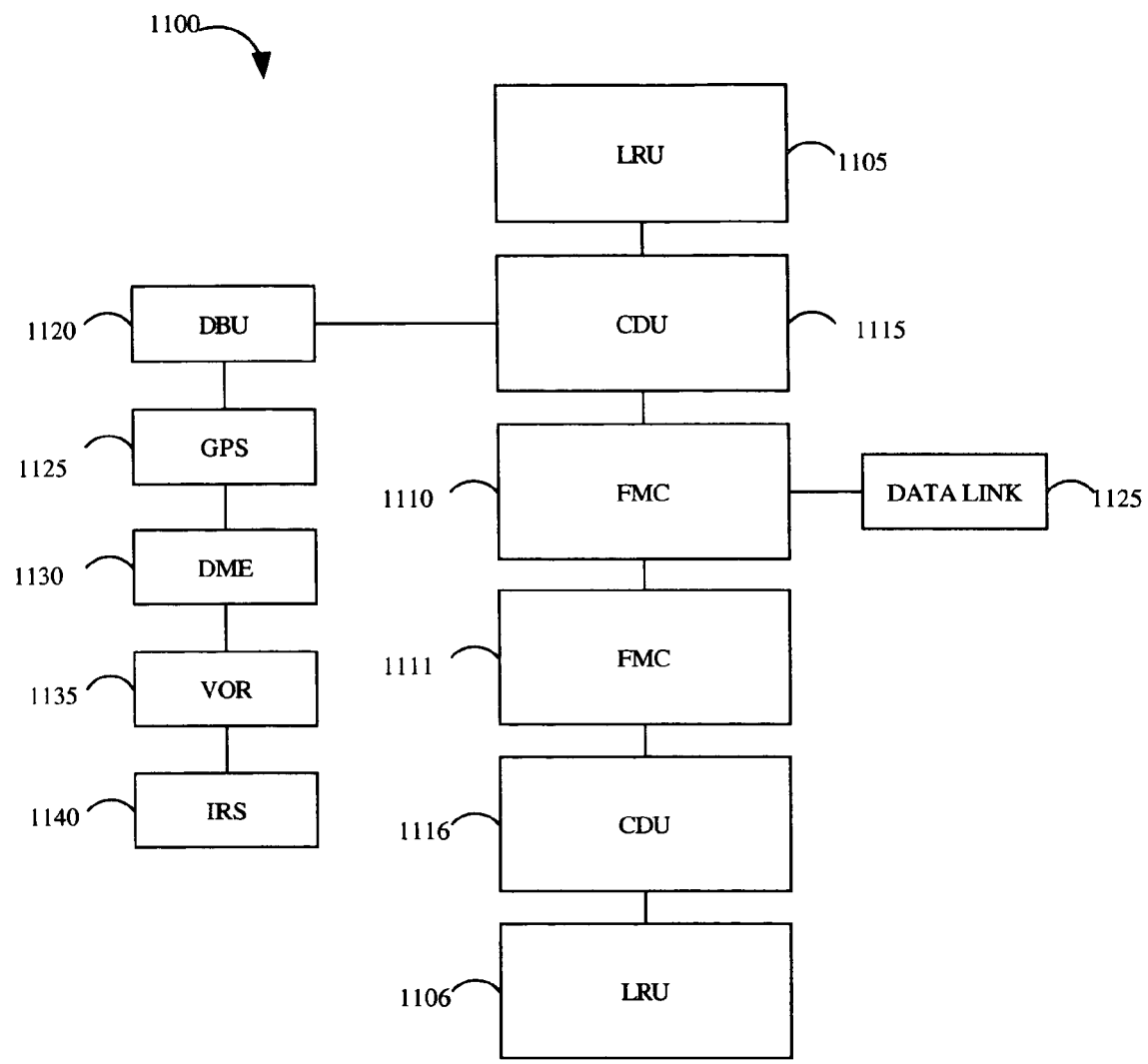
FIG. 11 depicts a block diagram of an aircraft FMS unit in accordance with the present invention.

Referring to FIG. 11, a block diagram of an aircraft FMS component 1100 of a system in accordance with the present invention is shown. Aircraft FMS may be comprised of a standard FMS and spread spectrum receiver for receiving flight performance data from remote spread spectrum transmitter and processing flight performance data. Aircraft FMS 1100 may be substantially comprised of one or more line replaceable units (LRUs) 1105-1106, one or more flight management computer (FMC) modules 1110-1111, one or more control display units (CDUs) 1115-1116 and a data base unit (DBU) 1120. Additionally, aircraft FMS 1100 may use available combinations of Global Positioning System (GPS) 1125, Distance Measuring Equipment (DME) 1130, VHF Omnidirectional Radio Range (VOR)/DME 1135, Inertial Reference System (IRS) 1140, and dead reckoning data to provide en route, terminal and non-precision approach navigation guidance for the aircraft. Aircraft FMS 1100 may be fully functional or may be functionally reduced to perform functions necessary for certain fast control loop applications that cannot tolerate delays. For example, aircraft FMS 1100 may provide guidance and processing for vehicle control functions such as autopilot. Aircraft FMS 1100 may be further comprised of situational awareness and hazard and collision avoidance systems. Aircraft FMS 1100 may be contained in an Integrated Avionics Processing System (IAPS), reducing avionics weight and simplifying avionics interconnect. A pilot may interface with aircraft FMS 1100 by utilizing an aircraft FMS CDU 1115-1116, which may be optimized for pilot interface. For example, aircraft FMS CDU 1115-1116 may be an integrated keyboard and textual display unit and provide FMS map information and text data in a substantially eyes forward direction. Additionally, aircraft FMS CDU 1115-1116 may employ a scratchpad entry structure that allows for rapid entry and retrieval of data for system or operator use.

Aircraft FMS may be defined for single or multiple operation by configuring the IAPS with a desired number of FMC modules 1110-1111 and installing a CDU for each module. For example, aircraft FMS 1100 may be installed as dual configuration, allowing synchronization of lateral and vertical flight plans. Triple configuration installation may allow a third FMS unit to operate in a standalone manner as a hot spare. Position solutions may be computed by all FMS units, and if a conflict arises between two active units, a third FMS may be alerted to resolve the conflict.

Aircraft FMS 1100 may include an installed data link segment 1125 and may be operative to communicate with a wireless router segment through wireless communications link, and wireless router segment may route files it receives from a remote data link segment. Data link segment 1125 may collect and store flight performance data generated during flight. Data link segment 1125 may also store information transferred from remote FMS to the aircraft via a wireless router. In a preferred embodiment, aircraft FMS data link segment 1125 may be a receiver capable of downloading and demodulating transmitted data to execute commands transferred from remote FMS.

Figure 12:
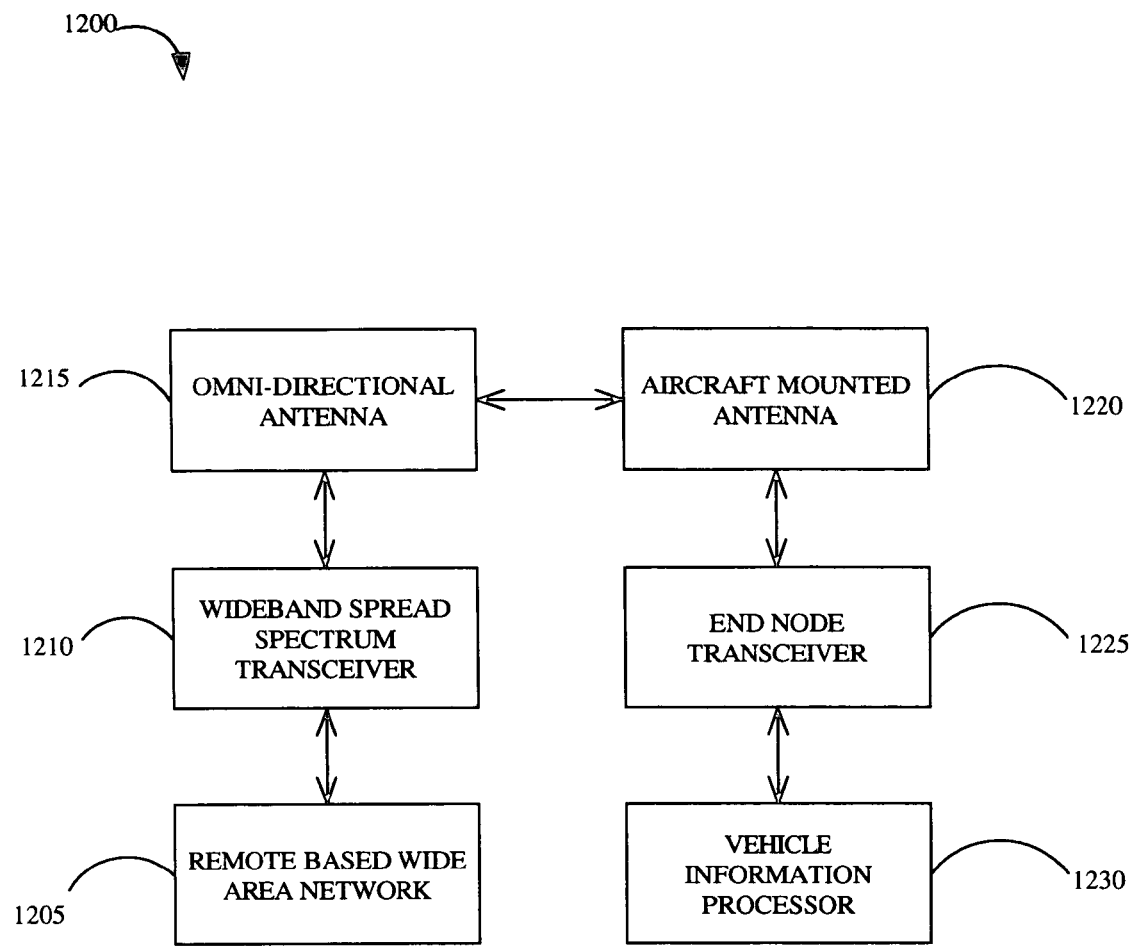
FIG. 12 depicts a block diagram of a communication system in accordance with the present invention.

Referring to FIG. 12, a block diagram of a communication system 1200 in accordance with the present invention is shown. Communication system 1200 may be a reliable, secure data system for communication between remote FMS and aircraft FMS. For example, communication system 1200 may be a fully integrated common information network (CIN) link to provide secure and encrypted communication links between aircraft and remote-based users. Communication system 1200 may utilize narrowband or broadband capabilities for two-way communications between aircraft and remote stations. In a preferred embodiment, communication system 1200 is a secure RF link such as a wireless spread spectrum based communication link capable of monitoring and commanding navigation functions from a remote station. For example, communication system 1200 may be suitable for transferring remote FMS monitored data to aircraft FMS.

Communication system 1200 may be substantially comprised of a remote based wide area network 1205 and a wideband spread spectrum transceiver 1210 for transmitting a communication signal. The communication signal may comprise a direct sequence spread spectrum (DSSS) signal, a frequency hopping spread spectrum (FHSS) signal, a code division multiple access (CDMA) signal, a multi-code direct sequence spread spectrum (MC-DSSS) signal or other such spread spectrum signal including any combination of the described spread spectrum technologies. Communication system 1200 may be further comprised of an omni-directional antenna 1215, an aircraft mounted antenna 1220, and an end node transceiver 1225 for interfacing with vehicle information processor 1230. Satellite capability may provide data and voice communication between pilot and remote flight manager in oceanic and mountainous or high-latitude domains and may ensure that immediate contact may be achieved and that continuous automatic dependent surveillance (ADS) is available.

Communication system 1200 may allow instantaneous network wide notification of crisis decisions. For example, a security administrator seeking to rapidly restrict access to airspace around a sports stadium because of a terrorist threat may input a restriction directly into the network. Remote based flight manager may immediately respond, updating the flight plans of affected aircraft to comply with the security constraint and instantly informing the affected flightdeck crews about the security issue. Additionally, flight manager may ground any managed aircraft in the vicinity of an emergency or hazard via the communication system 1200. New flight plans may be issued to aircraft already airborne to effect a safe and orderly response to a crisis.

The communication system 1200 may further enable system wide instant notification of such situations as clear air turbulence, abrupt weather changes or other such hazards. Communication system 1200 may also provide real-time, integrated information regarding aircraft trajectories, air traffic flow, and other conditions. For example, a pilot who experiences clear air turbulence may report it to the network, which may then notify other pilots in the area and alter their respective flight plans. All authorized parties may have access to hazard, weather and other such information, enabling rapid collaborative decision-making during emergency events, even among geographically dispersed decision makers.

Remote FMS may also be utilized in unmanned aerial vehicles (UAVs). Conventional UAVs do not typically have onboard flight planning functionality. UAV optimization may be achieved by including a flight planning function in one or more UAVs coupled to remote FMS via a communication link. One or more UAVs may be navigated, commanded or controlled by remote FMS. Remote FMS may manage a UAV's mission profile, such as altitude, range or duration, or control data acquisition and transmission of information. For example, data such as waypoint headings may be calculated and transferred to UAV by remote flight manager, enabling the UAV to fly to a desired waypoint.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system for managing at least one aircraft, comprising:
   an aircraft flight management system, said aircraft flight management system being located within an aircraft, said aircraft flight management system including a receiver for receiving data;
   a second aircraft flight management system, said second aircraft flight management system being located within a second aircraft, said second aircraft flight management system including a receiver for receiving data; and
   a remote flight management system, whereby said remote flight management system is operably connected to said aircraft flight management system and said second aircraft flight management system via a wireless link, said remote flight management system including a display suitable for presenting a graphical image, said graphical image capable of being segmented for displaying a graphical man and textual aircraft data for each of said aircraft and said second aircraft, said remote flight management system optimizes landing determination between said aircraft and said second aircraft based upon fuel information, passenger information and gate information.

2. The system as claimed in claim 1, wherein said aircraft flight management system further includes a display for presentation of said data.

3. The system as claimed in claim 1, wherein said remote flight management system includes a navigation guidance for retrieving navigation data for said aircraft and a transmitter for wirelessly transmitting said flight performance data to said aircraft flight management system.

4. The system as claimed in claim 1, wherein said remote flight management system maintains a remaining fuel amount information, fuel rate, and a consumption fuel cost for said aircraft and said second aircraft.

5. The system as claimed in claim 4, wherein said remote flight management system determines a landing priority for said aircraft and said second aircraft based upon said a remaining fuel amount information, fuel rate, and a consumption fuel cost for said aircraft and said second aircraft.

6. The system as claimed in claim 5, wherein said remote flight management system is capable of retrieving data from a worldwide network.

7. The system as claimed in claim 6, wherein said data includes gate availability and connecting flight information of passengers of said aircraft.

8. The system as claimed in claim 7, wherein said landing priority is further based upon gate availability and connecting flight Information of passengers of said aircraft and said second aircraft.

9. A method for managing an aircraft via a remote flight management system, comprising:

receiving navigation information from sensors of a first aircraft and a second aircraft, said navigation information being wirelessly transmitted to a remote flight management system;

determining a position and velocity of said first aircraft and said second aircraft;

determining a steering guidance and navigational path based upon a destination of said first aircraft and said second aircraft and position/velocity Information for said first aircraft and said second aircraft;

displaying a graphical image, said graphical image being segmented for displaying a graphical map and textual aircraft data for each of said aircraft and said second aircraft; and transferring said steering guidance and navigational path information to said first aircraft and said second aircraft via a wireless link, wherein said first aircraft and said second aircraft operates according to said steering guidance and navigational path, said steering and navigational path being based upon fuel information, passenger information and gate information.

10. The method as claimed in claim 9, wherein said sensors include global positioning system receiver.

11. The method as claimed in claim 9, wherein said steering guidance and navigational path is adjusted to account for weather issues.

12. A system for managing at least one aircraft, comprising:

an aircraft flight management system, said aircraft flight management system being located within an aircraft, said aircraft flight management system including a receiver for receiving data and a display for presentation of said data;

a second aircraft flight management system, said second aircraft flight management system being located within a second aircraft; and a remote flight management system, whereby said remote flight management system is operably connected to said aircraft flight management system and said second aircraft flight management system via a wireless link, said remote flight management system being capable of retrieving data for said aircraft and said second aircraft and transferring said flight performance data to said aircraft flight management system and said second aircraft flight management system, said remote flight management system including navigation guidance for retrieving navigation data for said aircraft and said second aircraft and a transmitter for wirelessly transmitting said flight performance data to said aircraft flight management system and said second aircraft flight management system, said remote flight management system including a display suitable for presenting a graphical image, said graphical image capable of being segmented for displaying a graphical map and textual aircraft data for each of said aircraft and said second aircraft, said remote flight management system optimizing landing determination between said aircraft and said second aircraft based upon fuel information, passenger information and gate information.

13. The system as claimed in claim 12, wherein said second aircraft flight management system includes a receiver for receiving data from said remote flight management system.

14. The system as claimed in claim 13, wherein said remote flight management system maintains a remaining fuel amount information, fuel rate, and a consumption fuel cost for said aircraft and said second aircraft.

15. The system as claimed in claim 14, wherein said remote flight management system determines a landing priority for said aircraft and said second aircraft based upon said a remaining fuel amount information, fuel rate, and a consumption fuel cost for said aircraft and said second aircraft.

16. The system as claimed in claim 15, wherein said remote flight management system is capable of retrieving data from a worldwide network.

17. The system as claimed in claim 16, wherein said data includes gate availability and connecting flight information of passengers of said aircraft.

18. The system as claimed in claim 17, wherein said landing priority is further based upon gate availability and connecting flight information of passengers of said aircraft and said second aircraft.

19. The system as claimed in claim 18, wherein said remote flight management system includes a display.

20. The system as claimed in claim 19, wherein said display includes flight performance information of said aircraft and said second aircraft.

* * * * *